C. Q. JEFFERIES.
ROTARY ENGINE.
APPLICATION FILED MAY 1, 1919.
1,338,304.
Patented Apr. 27, 1920.
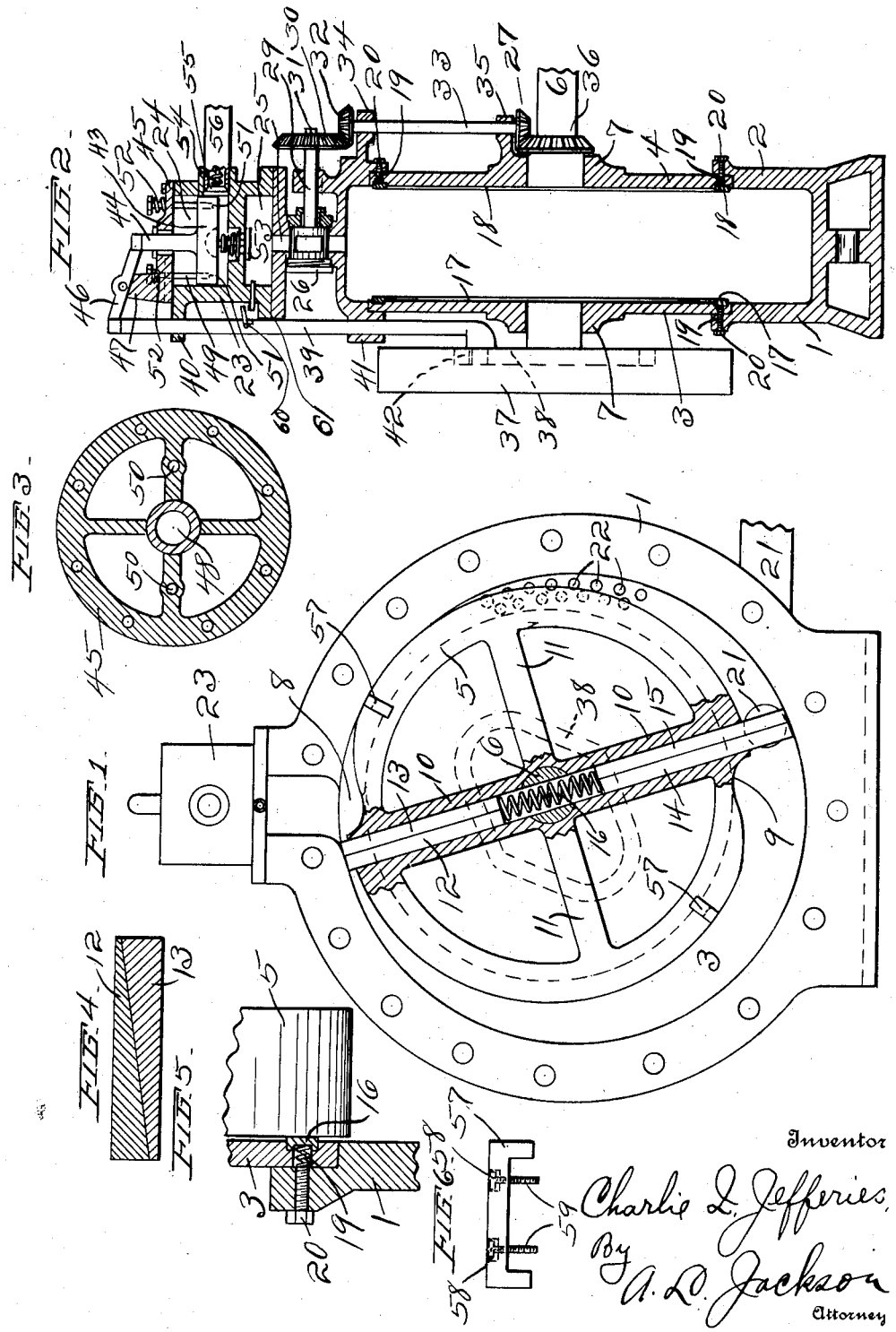

UNITED STATES PATENT OFFICE.

CHARLIE Q. JEFFERIES, OF FORT WORTH, TEXAS.

ROTARY ENGINE.

1,338,304.  Specification of Letters Patent.  Patented Apr. 27, 1920.

Application filed May 1, 1919. Serial No. 293,941.

*To all whom it may concern:*

Be it known that I, CHARLIE Q. JEFFERIES, a citizen of the United States of America, residing at Fort Worth, in the county of Tarrant and State of Texas, have invented certain new and useful Improvements in Rotary Engines, of which the following is a specification.

My invention relates to gas or gasolene engines and more particularly to rotary engines, and the object is to provide an engine of such construction that it will not be readily heated because of the ready expansion and exhaust of the gas, to provide simple and novel means for closing the space between the piston and cylinder at all times, and to provide an engine which is simple and economical of construction and easily operated. Other objects and advantages will be fully explained in the following description and the invention will be more particularly pointed out in the claims.

Reference is had to the accompanying drawings which form a part of this application.

Figure 1 is an interior elevation of the engine, partly in section, one side of the casing cylinder being removed. Fig. 2 is a diametrical section of the engine cylinder and also of the ignition chamber and gas feed chamber. Fig. 3 is a transverse section of the gas feed chamber. Fig. 4 is a cross-section of the radially and laterally movable pistons. Fig. 5 is a broken sectional view, illustrating the manner of holding the packing rings against the rotor or revolving piston. Fig. 6 is a detail view of the rotor packing devices.

Similar characters of reference are used to indicate the same parts throughout the several views.

The engine cylinder is made up of members 1 and 2 which may be bolted together, or these parts might be made integral, and by the side plates 3 and 4 which are bolted to the parts 1 and 2 respectively. A rotor or piston 5 is eccentrically mounted in the cylinder on a shaft 6. The side plates 3 and 4 having bearings 7 for the shaft 6. The rotor 5 is provided with recesses 8 and 9 in opposite sides thereof diametrically opposite each other to receive the ignited gases from the ignition chamber. The rotor may be provided with hollow spokes 10 and solid spokes 11. Radially slidable pistons 12 and 13 in one spoke 10 and similar pistons 14 and 15 in the other spoke 10 constitute the means for closing the space between the periphery of the rotor 5 and the interior of the cylinder during the revolution of the rotor. The shaft 6 will be rigid with the rotor 5 and the shaft 6 has an opening therethrough registering with the openings in the spokes 10 and springs 16 bear against the inner ends of the pistons 12 and 13, and 14 and 15 and keep the pistons bearing at their outer ends against the interior of the cylinder, as the rotor revolves. After the rotor starts to revolving, the centrifugal force would tend to keep the pistons bearing against the cylinder. Annular packing or cheek rings 17 and 18 are counter sunk in the interior faces of the side plates 3 and 4 and bear against the rotor 5 near the periphery thereof. Springs 19 mounted in the parts 1 and 3 and 2 and 4 bear against the outer faces of the packing rings 17 and 18 and set screws 20 are used to maintain the tension of the springs 19. The plates 3 and 4 are provided with exhaust ports 21 and are provided openings 22 for escape of air.

The members 12 and 13 and 14 and 15 have inclined surfaces so that these members will move laterally on each other and keep the spaces between these members and the plates 3 and 4 closed against the passage of explosive mixture or gases.

A cylinder 23 is mounted on top of the engine cylinder or main cylinder and divided into a compression chamber 24 and an ignition chamber 25 and the chamber 25 is connected to the main cylinder by a tubular connection 26. A port 27 leads from the chamber 25 to the main engine cylinder and this port is intercepted by a revolving valve 28 which has an opening therethrough adapted to register with the port 27 instantly as the explosion takes place. Means are provided for revolving the valve 28 and it is apparent that the port 27 will be opened and closed twice during each revolution of the valve 28. The valve 28 is provided with a shaft 29 which is journaled in a bearing 30 and a bevel gear wheel 31 which meshes with a bevel gear wheel 32. The gear wheel 32 is rigid with a vertical shaft 33 which is journaled in bearings 34 and 35. The shaft 33 is driven by a bevel gear wheel 36 which is rigid with the shaft 6 and by the bevel gear wheel 27 which meshes with wheel 36. The valve 28 will thus be positively driven.

On the other side of the engine cylinder from wheel 36 a fly wheel 37 is mounted on the shaft 6 and a cam groove 38 is formed in the side of the wheel 37. A push rod 39 is mounted in a bearing 40 which is formed on the cylinder 23 and in a bearing 41 formed on the engine cylinder casting. The push rod 39 is provided on its lower end with a lug 42 which projects into the groove 38 in the fly wheel 37. By the means thus described the push rod 39 will be raised and lowered twice during each revolution of the fly wheel 37. A piston 43 is movable vertically in the chamber 24 and the stem 44 for piston 43 projects through the cap 45. A lever 46 is fulcrumed in a bearing 47 which may be formed on the cap 25. The lever 46 is pivotally connected to the stem 44 and to the push rod 39. The lever 46 simply bears on top of the push rod 39 and on the stem 44. The cap 45 has an opening 48 for the stem 44. The piston 43 compresses air in the chamber 24. Rods 49 run through openings 50 in cap 45 and down through the piston 43 and into lock nuts 51. Springs 52 are mounted on the rods 49 between the cap 45 and heads on the rods. The rods 49 by means of the springs 52 will automatically raise the piston 43 to the upper limit of the piston. The chamber 24 is provided with a spring-actuated valve 53 which is adapted to be opened by compression of air in the cylinder and to be closed immediately upon the release of pressure in the cylinder. The valve is opened when the piston 43 is pressed down by the lever 46 and push rod 39. The chamber 24 is provided with a nipple 54 in which is mounted a spring-actuated valve 55 for closing the opening in the chamber 24 to the carbureter (not shown) through pipe 56.

The rotor 5 is provided with packing members 57 at the rear of the recesses 8 and 9 to prevent any possible leaking of the explosive mixture backwardly.

A spark plug 61 projects into the chamber 25 and a contact maker 60 is loosely connected to the push rod 39 so that the contact maker will engage the spark plug at regular intervals, or whenever the push rod 39 is actuated.

What I claim is:—

1. An internal combustion engine comprising a cylinder having a compression chamber therein provided with intake and exhaust ports, a power transmitting shaft eccentrically mounted in said chamber, a rotor mounted on said shaft for driving the same, beveled piston slides radially mounted in said rotor and adapted to extend out of the periphery of said rotor, a spring operating through said shaft for projecting said slides radially outward, said rotor having recesses on opposite sides at the rear of said piston slides, means for supplying explosive mixture to said recesses and chamber, and means for igniting the explosive mixture.

2. An internal combustion engine comprising a cylinder having a compression chamber, a power transmitting shaft eccentrically mounted in said chamber, a rotor in said chamber for driving said shaft, means for supplying explosive mixture to said chamber, piston slides radially mounted in said rotor for controlling the explosive mixture, a balance wheel rigid with said shaft and provided with a cam groove in one side, and sparking mechanism operatively connected with said balance wheel and automatically actuated thereby for igniting the mixture in said chamber, said sparking mechanism consisting of a spark plug projecting in said chamber, a push rod having a lug engaging said groove, and a contact maker carried loosely on said push rod and adapted to engage said spark plug at regular intervals during operation.

3. An internal combustion engine comprising a cylinder having a compression chamber therein and provided with intake and exhaust ports, a power transmitting shaft eccentrically mounted in said chamber, a rotor mounted on said shaft for driving the same, pairs of piston slides mounted in said rotor and adapted to bear against the interior of said chamber, a common resilient element in said rotor bearing against the inner ends of said pairs of slides, said rotor having recesses in the periphery thereof at the rear of said piston slides and packing in the periphery at the rear of said recesses, and means for igniting the explosive mixture in said chamber.

In testimony whereof I set my hand this 24th day of March, 1919.

CHARLIE Q. JEFFERIES.